United States Patent [19]
Sabins et al.

[11] Patent Number: 4,524,828
[45] Date of Patent: Jun. 25, 1985

[54] METHOD OF USING THIXOTROPIC CEMENTS FOR COMBATING GAS MIGRATION PROBLEMS

[75] Inventors: Fred Sabins; Jerry D. Childs, both of Duncan, Okla.

[73] Assignee: Halliburton Company, Duncan, Okla.

[21] Appl. No.: 540,742

[22] Filed: Oct. 11, 1983

[51] Int. Cl.$^3$ ............................................. E21B 33/138
[52] U.S. Cl. ..................... 166/293; 106/90; 106/93; 166/295; 166/300; 523/130
[58] Field of Search ............... 166/283, 293, 295, 300; 106/90, 93; 523/130

[56] References Cited

U.S. PATENT DOCUMENTS

| | | | |
|---|---|---|---|
| 2,491,487 | 12/1949 | Faulwetter | 106/90 |
| 2,935,522 | 5/1960 | Samour | 260/429 R X |
| 3,804,174 | 4/1974 | Chatterji et al. | 166/293 |
| 3,835,926 | 9/1974 | Clement, Jr. | 166/292 |
| 4,082,563 | 4/1978 | Ellis et al. | 106/93 X |
| 4,236,849 | 12/1980 | Kennedy-Skipton | 166/293 X |
| 4,280,848 | 7/1981 | Ellis et al. | 106/93 X |
| 4,321,968 | 3/1982 | Clear | 166/293 X |
| 4,340,525 | 7/1982 | Hubner et al. | 106/90 X |
| 4,461,856 | 7/1984 | Willis et al. | 523/130 X |

*Primary Examiner*—George A. Suchfield
*Attorney, Agent, or Firm*—Thomas R. Weaver; Edward F. Sherer

[57] ABSTRACT

A thixotropic cement composition comprising water, hydraulic cement, a titanium chelate and a crosslinkable agent and methods of using same to combat migration of formation fluids in oil, gas and water wells are provided.

15 Claims, No Drawings

METHOD OF USING THIXOTROPIC CEMENTS FOR COMBATING GAS MIGRATION PROBLEMS

BACKGROUND OF THE INVENTION

1. Field of the Invention

This invention relates to the use of a particular thixotropic cement for sealing or cementing subterranean zones penetrated by a borehole, such as cementing the annular space between an oil or gas well casing and the surrounding formation, where said compositions establish sufficient static gel strength in a time frame sufficiently short to preclude gas migration or fluid flow through said composition prior to the time that the composition sets to a hardened state.

2. Description of the Prior Art

It is common practice in operations conducted to produce hydrocarbons from subterranean formations, to cement or seal the area between the drill pipe and the formation wall. This is accomplished via either directly introducing the cement into the space between the formation wall and the outer side of the casing or via pumping the cement into the casing with sufficient pressure to force the cement back up the annular space between the outside of the casing and the formation wall.

The zones adjacent the cement-containing annulus can contain fluids or gas ("formation fluids") under pressure. Often these formation fluids can enter and flow through the cement-containing annulus. The most common problem relates to annular gas flow (also called gas leakage or gas migration), which refers to the flow or migration of gas in a cemented casing-borehole annulus. Such gas can flow back to the surface, create communication between producing or other subterranean zones and can, when in high enough volume, create blowouts between the period of placement and before actual set. Minor interzone gas flow problems can sometimes be tolerated, although often at the expense of lower production. When the magnitude of leakage requires remedial action, expensive squeeze cementing jobs are necessary to control such interzone gas flow.

The theory of how formation fluid flow occurs revolves around two key cement slurry parameters, static gel strength and volume reduction. These parameters affect the cement column's ability to transmit hydrostatic pressure.

The first parameter, static gel strength, is the development of some internal rigidity in the matrix of the cement that will resist a force placed upon it. The development of static gel strength will start to occur immediately after pumping has stopped and will continue to increase until the cement has set. At some time before actual set, the cement will develop a static gel strength high enough to prevent any fluid from moving through it. Test have indicated that a gel strength 500 lbs/100 ft$^2$ is sufficient to prevent any movement, although at certain conditions such gel strength can be considerably lower. When the cement has developed a static gel strength high enough to prevent formation fluids from moving through it, the cement is said to have completed its transition phase. The cement column can now begin to support some of its own weight.

Volume reduction can occur in two ways. Fluids can be lost from the matrix of the cement slurry to the formation. Even when fluid loss values are very low, small amounts of fluid are still lost from the slurry and can result in a large pressure drop. Additionally, as the cement hydrates there is a hydration volume reduction. Such reduction can ultimately be as high as 3 percent. Where the static gel strength development and the volume reduction are sufficient for a pressure drop to be realized, the hydrostatic pressure can fall below the formation pressure and formation fluids can enter the cement filled annulus. If the gel strength of the cement slurry is not high enough to prevent further movement of formation fluids, a fingering or migration phenomenon will occur. However, where the gel strength is high enough and the formation fluids are not already moving through the cement column, flow will not be initiated. Traditionally, the petroleum industry has attempted to prevent formation fluid flow by increasing the slurry density, improving mud displacement, controlling mud-cement slurry compatibility, using fluid loss control additives, and multiple stage cementing. Although these techniques are helpful and have shown some measure of success, none have completely solved formation fluid flow problems.

U.S. Pat. No. 3,959,003 and 3,804,174 describe a cement composition that includes as an additive a complex reaction product of a water-soluble carboxyalkyl, hydroxyalkyl or mixed carboxyalkylhydroxyalkyl ether of cellulose and a polyvalent metal salt. The composition exhibits thixotropic properties and the preferred reaction product uses hydroxyethylcellulose and zirconyl chloride. Titanium complexes are not mentioned in these patents. Further, new testing procedures have indicated that the compositions of these patents exhibit rather limited thixotropic properties and in event do not exhibit sufficient thixotropic properties to meet the criteria for prevention of formation fluid migration of the present invention.

New techniques using cement slurries containing a stabilized, dispersed gas or cement slurries capable of internally generating gas have achieved a much greater degree of success. Such techniques are described in U.S. Pat. Nos. 4,304,298 and 4,340,427. However, there may be cases where it is undesirable to use such compressible cements, be it from logistical, economic, time or other standpoints.

Accordingly, a need exists for a method of cementing oil and gas wells that provides a highly thixotropic cement slurry that develops high gel strengths in a sufficiently short time span so as to prevent fluid invasion of the annulus even though the hydrostatic pressure may fall below the gas reservoir pressure during the transition of the slurry to a solid mass.

SUMMARY OF THE INVENTION

A variety of titanium chelates are used in combination with water-soluble crosslinkable resins such as cellulose ethers exemplified by hydroxyalkyl cellulose, carboxyalkyl cellulose, or carboxyalkylhydroxyalkyl cellulose; polyvinyl alcohol; homopolymers, copolymers and terpolymers of AMPS (2-acrylamido-2-methylpropane sulfonic acid), sodium vinylsulfonate, acrylamide, N,N-dimethylacrylamide, and acrylic acid, and mixtures thereof to produce cement slurries that have pronounced thixotropic properties and rapidly develop very high static gel strengths. The magnitude of the static gel strength can be controlled by the level of added titanium chelate and cellulose derivatives. Such slurries can be designed to effectively combat formation fluid flow.

To be effective such a thixotropic cement slurry must develop static gel strength at a rate sufficient to maintain the hydrostatic pressure above the reservoir pressure during the period when pumping ends and static gel strength of sufficient magnitude to prevent fluid migration is reached. Such a thixotropic slurry has been discovered and comprises water, hydraulic cement, a titanium chelate crosslinking agent, and a water-soluble crosslinkable resin such as cellulose ethers as exemplified by hydroxyalkyl cellulose, carboxyalkyl cellulose, or carboxyalkylhydroxyalkyl cellulose; polyvinyl alcohol; homopolymers, copolymers, and terpolymers of AMPS (2-acrylamide-2-methylpropane sulfonic acid), sodium vinylsulfonate, acrylamide, N,N-dimethylacrylamide, and acrylic acid; and mixtures thereof. Such a slurry may optionally include other common cement additives such as retardants.

So that the above-recited features, advantages and objects of the invention, as well as others, which will become apparent, are attained and can be understood in detail, more particular description of the invention is set forth below with respect to typical embodiments thereof, but the described embodiments should not be considered limiting of the scope, for the invention may admit to other equally effective embodiments which will be apparent from the description to one of ordinary skills in the art.

DESCRIPTION OF THE PREFERRED EMBODIMENTS

In well completion operations cement slurries are almost universally used to fill the annular space between casing and open hole. After setting, the principal functions of such cement slurries are to restrict fluid movement between formations to protect the casing from corrosion and to support the casing. Cements are made from high calcium carbonate materials, such as limestone, and clay shale, iron and aluminum oxides are sometimes added to supplement the amount of each found in the clay or shale. The API publication, "API Specifications for Materials and Testing for Well Cements", API Spec 10, First Edition, January, 1982, describes specifications for unblended cement used in the formation of cementing slurries for oil well applications.

The cement slurry thickening and set times are strongly dependent upon temperature and pressure. To obtain optimum results a variety of additives are often included in the formulation of a cement slurry to vary cement density, increase or decrease strength, accelerate or retard setting time, control filtration rate, reduce slurry viscosity, increase resistance to corrosive fluids, bridge formations for lost circulation control, and improve economics. Essentially, a cement meeting API specifications is mixed with water and other additives to provide a cementing slurry appropriate for the conditions existing in each individual oil well.

In the present invention, it was found that certain titanium chelates can be used as crosslinking agents and provide excellent thixotropic properties and gel strength development. Further, the titanium chelates of this invention along with an appropriate crosslinkable additive can promote the development of 500 lbs/100 ft$^2$ static gel strength in a relatively short time. This value is high enough to prevent gas penetration through a cement column. However, the titanium chelate crosslinking agents are somewhat sensitive to temperature, and hence, in developing a specific slurry one must be concerned with the downhole circulating temperature.

Another related benefit of the present invention relates to the discovery that use of titanium chelate cement additives in thixotropic or even conventional cement slurries containing additives (including dispersants) result in the achievement of uniform or enhanced compressive strength development. Often the development of adequate compressive strength in 12 or 24 hours can be extremely difficult to obtain at liner tops, especially when the liner is long enough that the static temperature at the top of the liner is near or below the Bottom Hole Circulating Temperature (BHCT). In some liner jobs the top of the liner static temperature is 15° to 40° F. cooler than the BHCT. In these cases the cement slurries may take an excessive amount of time to reach enough compressive strength for the company to continue operations. The cement compositions of the present invention combat this delay in compressive strength. The present compositions are shear sensitive, meaning that while undergoing shear such compositions remain fluid and pumpable for an ample period of time, but when static, such compositions develop high gel strength in a short period of time followed by rapid compressive strength development.

The material to be crosslinked is selected from the group consisting of water-soluble crosslinkable resins such as cellulose ethers exemplified by hydroxyalkyl cellulose, carboxyalkyl cellulose or carboxyalkylhydroxyalkyl cellulose; polyvinyl alcohol; homopolymers, copolymers and terpolymers of AMPS (2-acrylamido-2-methylpropane sulfonic acid), sodium vinylsulfonate, acrylamide, N,N-dimethylacrylamide, and acrylic acid; and mixtures thereof.

The titanium crosslinking agents are titanium chelates. Titanium chelates are formed by the reaction of titanium tetrachloride or titanium alkoxides (usually $C_2$–$C_4$) with a wide variety of bi- or multi-functional organic compounds. One of the functional groups of the organic compound is usually hydroxyl (or enolic carbonyl) for interchange with a chloride or alkoxide group attached to the titanium atom in the titanium chloride or alkoxide, thus liberating one mole of HCl or alcohol. The other group of the organic compound can also be hydroxyl or carboxyl, carbonyl or amino, and as a result glycols, hydroxy acids, dicarboxylic acids, diketones, keto esters and alkanolamines are available for chelation. For the most part glycols, hydroxy acids and dicarboxylic acids are stable in aqueous solution, while diketones, keto esters and alkanolamines are solvent-soluble and hydrolize at varying rates in aqueous systems.

A series of tests were conducted to determine how effective a variety of titanium chelates were in producing thixotropic behavior. The cement slurries tested were prepared by dry blending all the additives with the cement prior to addition to water. If any liquid additives were used, the liquid was added to the mixing water prior to adding cement. The cement slurry was placed is static gel strength measuring device and a standard thixotropic test was conducted.

The static gel strength measuring apparatus consists of three major components, the chamber and lid, the magnetic drive assembly, and the cord pulling assembly.

The chamber is a heavy wall, high strength metal vessel equipped with strip heaters attached directly to the outside of the chamber. A thermocouple is inserted into the vessel to allow the temperature of the vessel to be controlled. The lid of the chamber is equipped so that the principle drive shaft of the magnetic drive assembly can be inserted. On the shaft a stirring paddle is fitted over one end of the shaft and secured with a shear pin. On the other end of the principal drive shaft the magnetic drive head is connected. The magnetic drive head is then in turn connected by a belt system to a variable speed magnetic drive power source and torque measuring device. A thermocouple is inserted through the top of the magnetic drive head and down the middle of the hollow principal drive shaft. The lid of the chamber is equipped with two ports. One port is connected to a pressure volume pump used to generate pressure and the other port is equipped with a quick opening saftey valve. The bottom of the chamber is equipped with a quick opening valve and used to relieve the pressure and discharge the test slurry at the end of the test period. The cord pulling mechanism consists of a cord pulling capstan or drum arrangement driven by a variable speed gear motor with the cord running through the pulley arrangement to a load cell and then to the top of the magnetic drive head.

To determine the gel strength development of cement slurry under down hole conditions, this equipment was specifically designed for measuring static gel strength after a stirring period that simulated slurry placement. The equipment is designed to operate at a maximum temperature of 400° F. at 10,000 psi. The low friction magnetic drive allows the slurry to be stirred while monitoring consistency during the stirring time. After simulating placement time, the motor is shut off and the cord pulling system is attached to the magnetic drive head. Static gel strength is determined by continuously measuring the torque required to rotate the paddle at a very slow speed (0.5° to 2.0° per minute). At such speeds, a magnetic drive has very low friction and very accurate torque measurements can be made. Since the torque measuring system consists of a cordpulling capstan or drum arrangement driven by a variable speed gear motor accurate continuous rotation and means for continuously recording the torque is provided. The gel strength is then calculated from the torque measurement and the vessel geometry. The slow movement of the paddle allows static gel strength to be measured but does not inhibit gel strength development. Continuous static gel strength values can be measured up to a maximum of 1000 lbs/100 ft$^2$.

The standard thixotropic test procedure is as follows:

1. Stir the slurry with the magnetic drive consistometer for one hour while increasing temperature and pressure from ambient conditions to bottom hole circulating temperature (BHCT) and bottom hole pressure (BHP) according to schedule.
2. After one hour's stirring, set static for 15 minutes while continually measuring static gel strength.
3. After a static period of 15 minutes, stir for 15 minutes while continually measuring consistency.
4. Repeat static and stirring times a total of three times.

In the data that was developed, one basic slurry composition was tested. This slurry consisted of API Class H cement, 0.4% carboxymethylhydroxyethyl cellulose by weight of cement, 44% water by weight of cement and retarder as given in Table I.

Table I provides the range of temperatures, pressures and retarder amounts used in each simulated well condition. The temperature range varied from 140° F. to 275° F. The amount of retarder utilized was sufficient to provide at least 3½ hours thickening time at test conditions where thickening time is taken as the definition given in API Specification 10.

TABLE I

| Test Conditions and Retarder Amounts | | |
|---|---|---|
| Temp (°F.) | Pressure (psi) | Percent by Weight Retarder* |
| 140 | 6000 | 0.4 |
| 170 | 8000 | 1.2 |
| 180 | 8000 | 1.2 |
| 200 | 8000 | 1.6 |
| 215 | 8000 | 2.0 |
| 245 | 8000 | 2.2 |
| 275 | 8000 | 2.4 |

*The retarder used was a 1:1 mixture of calcium lignosulfonate and potassium pentaborate.

Table II provides the physical and chemical properties of the titanium compounds tested. Excepting the zirconium containing additives, all compounds were DuPont products.

TABLE II

| Physical and Chemical Properties of Titanium Compounds Considered as Thixotropic Cement Additives | | |
|---|---|---|
| Compound | Physical Form | Chemical Description |
| Zirconium oxychloride | Solid | Zirconium oxychloride (zirconyl chloride)—$ZrOCl_2$ |
| Zirconium acetylacetonate | Liquid | Zirconium chelate of acetylacetone |
| Titanium oxychloride | Liquid | Titanium oxychloride ($TiOCl_2$) |
| Titanium triethanolamine | Liquid (Non-aqueous) | Prepared by reaction of titanium isopropoxide with two moles of triethanolamine. $Ti(OCH(CH_3)_2)_4 + 2N(CH_2CH_2OH)_3 \rightarrow (C_3H_7O)_2Ti[OCH_2CH_2N(CH_2CH_2OH)_2]_2 + 2C_3H_7OH$ The two moles of isopropyl alcohol are left in the reaction mixture. Thus, this compound consists of triethanolamine titanate plus isopropyl alcohol. |
| Titanium monotriethanolamine | Solid | Titanium Monotriethanolamine, $(NCH_2CH_2O-)_3Ti(OCH(CH_3)_2)$, contains about 19.0% Titanium by weight. |
| Titanium monotriethanolamine plus fructose (Blend I) | Solid | A mixture of 57% titanium monotriethanolamine and 43% fructose by wt. |
| Titanium monotriethanolamine plus fructose (Blend II) | Solid | A mixture of 73% titanium monotriethanolamine and 27% fructose by wt. |
| Titanium triethanolamine deposited on diatomaceous earth | Solid | Titanium triethanolamine deposited on diatomaceous earth. Contains about 4.1% Ti by wt. |
| Titanium monotriethanolamine solution | Liquid | Solution of titanium monotriethanolamine containing about 7.6% Ti by wt. |
| Hydrolyzed, partially polymerized titanium acetylacetonate | Solid | Organic titanate (chelate) from hydrolyzed titanium acetylacetonate. Prepared by controlled addition of water as illustrated below. $Ti(Cl)_2(OC(CH_3)=CHCOCH_3)_2 + 2H_2O \rightarrow Ti(OH)_2(OC(CH_3)=CHCOCH_3)_2 + 2HCl$. $Ti(OH)_2(OC(CH_3)=CHCOCH_3)_2 + H_2O \rightarrow$ partially polymerized, solid product. |
| Titanium lactate | Liquid (Aqueous) | Prepared by the reaction of titanium isopropoxide with two moles of lactic acid in presence of water. |

TABLE II-continued

Physical and Chemical Properties of Titanium Compounds Considered as Thixotropic Cement Additives

| Compound | Physical Form | Chemical Description |
|---|---|---|
| | | $Ti(OCH(CH_3)_2)_4 + 2CH_3CH(OH)COOH \rightarrow [Ti(OH)_2(OCH(CH_3)COO^-)_2][H^+]_2 + 4C_3H_7OH$ |
| | | The acidic protons are neutralized with ammonium hydroxide. This product may be described as the ammonium salt of titanium lactate. However, the structure of this product is complicated by polymerization of the titanium chelate to some degree. |
| Polymerized titanium lactate | Solid | Prepared from the titanium lactate. Extent of polymerization has been increased to insolubilize the chelate and yield a solid containing about 21.4% Ti. |
| Lactic acid reacted with hydrated $TiO_2$ | Solid | One mole of lactic acid reacted with two moles of hydrated $TiO_2$. Ti content is about 20.8% by wt. |
| Titanium tartrate | Liquid | Tartaric acid analog of titanium lactate. Contains about 8.2% Ti by wt. |
| Titanium malate | Solid | Titanium malate which has been spray dried. Contains about 7.9% Ti by wt. |
| Titanium acetylacetonate | Liquid (Non-aqueous) | Prepared by the reaction of titanium isopropoxide with two moles of acetylacetone. $Ti(OCH(CH_3)_2)_4 + 2(CH_3COCH_2COCH_3) \rightarrow Ti(OC_3H_7)_2[OC(CH_3)=CHOCH_3]_2 + 2C_3H_7OH$ The two moles of isopropyl alcohol are left in the reaction mixture. |

Table III provides the actual data obtained. The additive description along with the amount of additive used (by weight of cement), temperatures and actual gel strength measurements are shown. The retarder level at each temperature is given in Table I. The gel strengths given are the maximum strength in pounds per 100 feet square reached during each 15 minute period.

TABLE III

Gel Strength Measurements[a]

| Additive | Percent Addition (bwc) | Temperature (°F.) | Gel Strength (lbs/100 ft²) 1 | 2 | 3 |
|---|---|---|---|---|---|
| None | 0 | 140 | 12 | 30 | 70 |
| Zirconium oxychloride | 1.0 | 140 | 60 | 70 | 60 |
| | 1.0 | 200 | 75 | 100 | 95 |
| Zirconium acetylacetonate | 0.5 | 140 | 75 | 100 | 160 |
| Titanium oxychloride | 0.5 | 140 | 365 | — | — |
| Titanium triethanolamine | 0.25 | 140 | 30 | 40 | 32 |
| | 0.50 | 140 | 0 | 0 | 20 |
| | 0.50 | 200 | 350 | 205 | 212 |
| | 0.50 | 275 | 305 | 310 | 225 |
| Titanium Monotriethanolamine | 0.25 | 140 | 50 | 5 | 15 |
| | 0.25 | 140 | 40 | 20 | 15 |
| | 0.50 | 140 | 50 | 50 | 50 |
| | 0.50 | 140 | 25 | 25 | 25 |
| | 0.25 | 180 | 200 | 320 | 270 |
| | 0.25 | 215 | 500 | 500 | 500 |
| | 0.25 | 275 | 265 | 250 | 220 |
| | 0.50 | 275 | 225 | 500 | 500 |
| Titanium monotriethanolamine plus fructose (Blend I) | 0.50 | 140 | 500 | 500 | 500 |
| | 0.50 | 275 | 80 | 90 | 85 |
| | 0.50 | 275 | 70 | 100 | 100 |
| Titanium monotriethanolamine plus fructose (Blend II) | 0.25 | 140 | 400 | 500 | — |
| | 0.50 | 140 | 500 | 500 | 500 |
| | 0.50 | 180 | 200 | 210 | — |
| | 0.50 | 215 | 500 | 500 | 500 |
| | 0.50 | 275 | 500 | 500 | 500 |
| Titanium triethanolamine deposited on diatomaceous earth | 0.50 | 140 | 135 | 120 | 100 |
| Titanium monotriethanolamine solution | 0.25 | 180 | 500 | 200 | 250 |
| | 0.50 | 180 | 450 | 500 | 500 |
| Hydrolyzed, partially polymerized titanium acetylacetonate | 0.5 | 140 | 205 | 200 | 205 |
| Titanium Lactate | 0.25 | 170 | 160 | 200 | 215 |
| Polymerized titanium lactate | 0.5 | 275 | 270 | 330 | 235 |
| Lactic acid reacted with hydrated $TiO_2$ | 0.5 | 140 | 350 | 400 | 300 |
| | 0.5 | 200 | 160 | 160 | 195 |
| | 0.5 | 275 | 40 | 35 | 40 |
| Titanium tartrate | 0.5 | 140 | 115 | 150 | 155 |
| | 0.5 | 275 | 180 | 390 | 280 |
| Titanium malate | 0.5 | 140 | 500 | 500 | 500 |
| | 0.5 | 275 | 20 | 40 | 45 |
| Titanium acetylacetonate[b] | 0.5 | 245 | 450 | 500 | 500 |

[a]Slurry composition: Class H Cement, 0.4% CMHEC, 44% $H_2O$
[b]Replacement of CMHEC with HEC in slurry formulation This data indicates that certain titanium containing agents can impart thixotropic properties to cements under the above conditions. Such agents are represented by the formula:

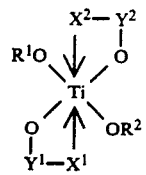

where $X^1$ and $X^2$ represent functional groups containing oxygen or nitrogen, $Y^1$ and $Y^2$ represent two or three carbon atom chains, and $R^1$ and $R^2$ may be hydrogen, substituted or unsubstituted alkyl and aryl groups such as methyl, ethyl, allyl, n-propyl, isopropyl, benzyl, etc., or combinations thereof. Additionally, $-OR^1$, or $-OR^2$ may be halogen atoms.

Additionally, variations of the structure believed effective include complete or partial replacement of the alkoxide, —OR, or halogen atoms with one or more of the allowable $-OY^1X^1-$ or $-OY^2X^2-$ functional groups or replacement of one or more of the $-OY^1X^1-$ or $-OY^2X^2-$ functional groups with alkoxide —OR or halogen. The resultant agent may be used in solid or liquid form, dissolved in aqueous or nonaqueous media, or placed on carriers such as silica, diatomaceous earth or other inert, solid media.

Examples of products observed to be useful in the present invention are more particularly described in the three following formulas:

(a) Acetylacetonate Titanium Chelate—[(CH$_3$)$_2$CHO]$_2$Ti[OC(CH$_3$)=CHCOCH$_3$]$_2$ schematically written:

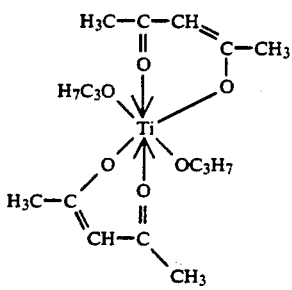

and modifications of this product which include replacement of the —C$_3$H$_7$ group with various other alkyl or aryl groups or replacement of the —OC$_3$H$_7$ groups with hydroxide or halogens. Partially polymerized versions of this product which involve polymerization at the titanium atom are also useful in this invention. In addition, one or both of the acetylacetonate ligands may be replaced by other beta-diketones. Also, the products may involve only one beta-diketone ligand.

(b) Lactic Acid Titanium Chelate—[(HO)$_2$Ti(OCH(CH$_3$)COO—)$_2$] [M$^+$]$_2$ schematically written:

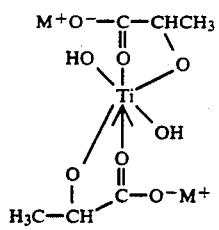

and modifications of this product where M$^+$ is hydrogen, alkali metal cation, ammonium, or protonated amine. Partially polymerized versions of this product which involve polymerization at the titanium atoms are also useful in this invention. One or both of the lactate ligands may be replaced by a wide variety of other alpha-hydroxy acids such as salicyclic, glycolic, malic, tartaric, citric, alpha-hydroxybutyric, and numerous sugar-derived acids from glyceric to saccharic and gluconic acids. It is also possible to prepare chelates using dicarboxylic acids. Two common chelates of this type are prepared with oxalic and phthalic acids or their salts.

(c) Triethanolamine Titanium Chelate—[(CH$_3$)$_2$CHO]$_2$Ti[OCH$_2$CH$_2$N(CH$_2$CH$_2$OH)$_2$]$_2$ schematically written:

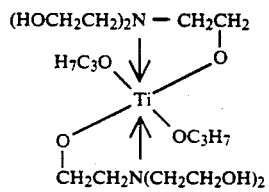

and modifications of this product which include replacement of the —C$_3$H$_7$ group with various other alkyl or aryl groups or replacement of the —OC$_3$H$_7$ groups with hydroxide or halogen atoms, and partially polymerized versions of these products. Other ligands useful in this class which may replace one or both of the triethanolamine ligands include tripropanolamine, (R$^1$)$_2$N—R$^2$—OH where R$^1$ is hydrogen, methyl, or ethyl and R$^2$ is ethyl or propyl, 2-(2-aminoethylamino)ethanol, (HOR)(R$^1$)N—R$^2$—NR$^1$R$^3$ where R is an ethylenic group and R$^1$, R$^2$, R$^3$ are alkyl, hydroxyalkyl, or aminoalkyl groups, quadrol [(HOCH(CH$_3$)CH$_2$)$_2$NCH$_2$CH$_2$N(CH$_2$(CH$_3$)HCOH)$_2$], theed [(HOCH$_2$CH$_2$)$_2$NCH$_2$CH$_2$N(CH$_2$CH$_2$OH)$_2$], and various other alkanolamines. These complexes may contain one to four alkanolamine ligands per titanium. A perferred titanium chelate from this class is prepared by the reaction of titanium isopropoxide with two moles of triethanolamine to yield titanium triethanolamine plus two moles of isopropyl alcohol. The product is a liquid containing about 8.3% titanium.

A preferred class of solid titanium chelate is described in U.S. Pat. No. 2,935,522. These agents have the following general formula:

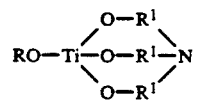

where R is isopropyl (—C$_3$H$_7$) and R$^1$ is ethylene or isopropylene. A preferred titanium crosslinking agent of this invention is titanium monotriethanolamine represented by the general structure where R is isopropyl and R$^1$ is ethylene. This material is a white, free flowing solid which can be dry blended with the cement. Modifications of this structure include products containing two triethanolamine groups with proposed structure represented by:

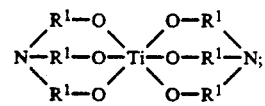

and dimers with a structure assumed to be similar to the following:

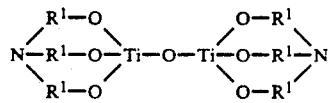

where R$^1$ is ethylene or isopropylene.

In addition, it has been observed that the blending of certain compounds with the titanium chelates tends to enhance the thixotropic response observed with a given chelate. At low temperatures, especially below about 140° F., cement compositions containing the described titanium chelates show limited thixotropic properties. The reason for this is believed to be a tendency at these low temperatures for the titanium to be in a form which renders it ineffective as a crosslinking agent. The addition of an effective amount of certain sugars activates the titanium at the low temperatures and allows it to act as an effective crosslinking agent. A preferred compound of this type is fructose although it is presumed that compounds such as mannose, glucose, arabinose, galactose, catechol and other compounds containing hydroxyl groups in the cis configuration would function as well.

A preferred embodiment of the present invention was tested under actual downhole conditions. The cement job was a production string. Production strings typically have histories of gas flow problems. The well conditions were as follows:

Total depth: 12,000'
Hole Size: 6¼"
Casing Size: 2⅞" long string
Bottom Hole Circulating Temperature: 239° F.
Bottom Hole Static Temperature: 300° F.
Well Fluid: 15.4 lbs/gal mud
Displacement Fluid: 2% KCl water A slurry having the following composition was first prepared and tested in the laboratory:

Lone Star Class H Cement + 30% Coarse Silica + 4% CMHEC + 0.5% Potassium Pentaborate + 0.5% Calcium Lignosulfonate + 0.25% Titanium Triethanolamine Slurry density—16.4 lbs/gal
Slurry volume—1.35 ft$^3$/sk
Slurry water—5.2 gal/sk The laboratory gel strength tests indicated this slurry gelled to 500 lbs/100 ft$^2$ in 20 minutes at a bottom hole circulating temperature of 240° F. and a pressure of 8000 psi. The job was run and considered successful by the customer. No gas flow was observed on the well and the casing shoe withstood the pressure test.

It should be noted that a variety of retarders may be used in the cement compositions of the present invention, but these retarders must not significantly disperse the slurry in question. The reason for avoiding retarders that will thin the slurry is that such dispersants will also adversely affect the slurries thixotropic properties. An example of a preferred retarder system is calcium lignosulfonate and potassium pentaborate in a 1:1 ratio by weight.

The crosslinkable material may also work as a retarder. This is one reason that CMHEC and HEC are preferred materials at higher temperatures. Both CMHEC and HEC are known to act as cement set retarders. The polymers containing acrylic acid also display retardation properties. The other named crosslinkable materials do not significantly retard the set of a cement slurry and as such are useful primarily at lower temperatures.

It should be noted that the extent of retardation does not significantly affect the thixotropic properties of the cement composition, so long as the retarder used doesn't significantly disperse the slurry in question. For example, the time to develop static gel strength remains the same whether or not the composition is pumped for 2 or 8 hours.

The amount of titanium necessary to impart significant thixotropic properties to the cement composition will vary with respect to desired static gel strength, the amount of crosslinkable material present and temperature. Hence, the general amount required may vary from approximately 0.01% to about 10% by weight of cement. The preferred range will generally be about 0.25% to about 0.75% by weight of cement.

A preferred subclass of titanium chelate is the alkanolamines. Within this preferred subclass, a preferred alkanolamine is titanium triethanolamine. The most preferred titanium chelate is the solid form of titanium monotriethanolamine. Hence, the most preferred composition would be comprised of one or more of the preferred titanium chelates, one or more of the preferred crosslinkable agents and fructose.

While particular embodiments of the invention have been described, it will be understood that the invention is not limited thereto, since modifications may be made and will become apparent to those skilled in the art. For example, the titanium chelate can be deposited on an inert carrier to facilitate blending into the dry cement. Such carriers could include diatomaceous earth or silica flour.

What is claimed is:

1. A method for cementing a zone under pressure comprising pumping a thixotropic cement slurry into said zone, terminating pumping, and allowing said static slurry to set, wherein said slurry comprises water, hydraulic cement, a crosslinking agent selected from the group consisting of titanium chelates and a crosslinkable agent selected from the group consisting of water-soluble cellulose ethers; polyvinyl alcohol; homopolymers, copolymers and terpolymers of AMPS (2-acrylamido-2-methylpropane sulfonic acid), sodium vinylsulfonate, acrylamide N,N-dimethylacrylamide and acrylic acid; and mixtures thereof, whereby said slurry develops static gel strength in an amount sufficient to prevent fluid migration during some time after the pumping has terminated and until the cement slurry has set.

2. The method of claim 1 wherein said crosslinking agent is titanium monotriethanolamine.

3. The method of claim 2 wherein the titanium monotriethanolamine is in solid form and between 5% and 50% by weight sugar selected from the group consisting of fructose, mannose, glucose, arabinose, galactose, catechol and mixtures thereof, is dry blended therewith.

4. The method of claim 2 wherein the titanium monotriethanolamine is in solid form and between 10% and 30% by weight of fructose is dry blended therewith.

5. The method of claim 1 wherein said crosslinking agent is titanium triethanolamine.

6. The method of claim 1 wherein the crosslinkable agent is carboxymethylhydroxyethyl cellulose.

7. The method of claim 1 wherein the crosslinkable agent is hydroxyethyl cellulose.

8. The method of claim 1 wherein said titanium chelate is present in an amount of from about 0.01% to about 10% by weight of cement.

9. The method of claim 1 wherein said titanium chelate is present in an amount of from about 0.25% to about 0.75% by weight of cement.

10. The method of claim 1 wherein said titanium chelate is deposited on a neutral carrier.

11. The method of claim 10 wherein said neutral carrier is diatomaceous earth or silica flour.

12. A method of combating annular gas and fluid migration during cementing of the annular space between the casing and the formation wall of an oil or gas well or the like comprising pumping a thixotropic cement slurry into said space, terminating pumping, and allowing said slurry to set, wherein said slurry comprises water, hydraulic cement, and amounts of titanium monotriethanolamine and carboxymethylhydroxyethyl cellulose in an amount sufficient to prevent fluid migration during some time after the pumping has terminated and until the cement slurry has set.

13. The method of claim 12 wherein the titanium monotriethanolamine contains fructose.

14. The method of claim 12 wherein said titanium monotriethanolamine is present in an amount of from about 0.25% to about 0.75% by weight of cement.

15. The method recited in claim 1 wherein said static gel strength is about 500 lbs/100 ft$^2$.

* * * * *

UNITED STATES PATENT AND TRADEMARK OFFICE
CERTIFICATE OF CORRECTION

PATENT NO. : 4,524,828
DATED : June 25, 1985
INVENTOR(S) : Fred Sabins / Jerry D. Childs It is certified that error appears in the above-identified patent and that said Letters Patent is hereby corrected as shown below:

Column 1, at line 56, delete the words "Test have indicated that a gel strength 500 lbs/100" and insert therefore --Tests have indicated that a gel strength of 500 lbs/100--.

Column 2, at line 22, delete the word "No." and insert therefore --Nos.--.

Column 2, at line 32, insert the word --any-- between the word "in" and the word "event".

Signed and Sealed this

Seventeenth Day of December 1985

[SEAL]

Attest:

DONALD J. QUIGG

Attesting Officer

Commissioner of Patents and Trademarks